United States Patent
Dong-Sik

(10) Patent No.: US 7,317,752 B2
(45) Date of Patent: Jan. 8, 2008

(54) METHOD AND SYSTEM FOR LOCATING A GPS CORRELATED PEAK SIGNAL

(75) Inventor: Cho Dong-Sik, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 700 days.

(21) Appl. No.: 10/823,308

(22) Filed: Apr. 13, 2004

(65) Prior Publication Data

US 2005/0010362 A1    Jan. 13, 2005

(30) Foreign Application Priority Data

Jul. 11, 2003   (KR) ............... 10-2003-0047185
Aug. 23, 2003   (KR) ............... 10-2003-0058493

(51) Int. Cl.
*H04B 1/00* (2006.01)
(52) U.S. Cl. .................... 375/148; 375/150
(58) Field of Classification Search ......... 342/357.06, 342/357.09, 357.12; 375/148, 342, 343
See application file for complete search history.

(56) References Cited

U.S. PATENT DOCUMENTS

| 4,972,441 | A | * | 11/1990 | Roberts et al. | 375/342 |
| 5,134,407 | A | * | 7/1992 | Lorenz et al. | 342/352 |
| 5,625,632 | A | * | 4/1997 | Ishida et al. | 714/769 |
| 5,793,825 | A | * | 8/1998 | Humphreys et al. | 375/375 |
| 5,963,581 | A | * | 10/1999 | Fullerton et al. | 375/131 |
| 6,041,074 | A | * | 3/2000 | Nakamura | 375/142 |
| 6,259,401 | B1 | * | 7/2001 | Woo | 342/357.12 |
| 6,396,869 | B1 | * | 5/2002 | Park et al. | 375/146 |
| 6,665,358 | B1 | * | 12/2003 | Odagiri | 375/343 |
| 6,888,879 | B1 | * | 5/2005 | Lennen | 375/149 |
| 7,010,024 | B1 | * | 3/2006 | Eerola et al. | 375/152 |
| 2002/0175857 | A1 | * | 11/2002 | Abraham | 342/357.12 |
| 2003/0201932 | A1 | * | 10/2003 | Rabinowitz et al. | 342/357.09 |

FOREIGN PATENT DOCUMENTS

| KR | 1020020021932 A | 3/2002 |
| WO | PCT/US86/01765 | 12/1987 |
| WO | WO 03/017551 A2 | 2/2003 |

* cited by examiner

*Primary Examiner*—David C. Payne
*Assistant Examiner*—Leon-Viet Q Nguyen
(74) *Attorney, Agent, or Firm*—F. Chau & Assoc., LLC

(57) ABSTRACT

A global positioning system (GPS) receiver is provided, comprising a converter for converting received GPS signals to in-phase (I) and quadrature-phase (Q) digital signals; a correlator for generating expected codes and correlating the I and Q digital signals with the expected codes to output sampled I values and sampled Q values for a tap; a filter for filtering the sampled I values and sampled Q values to modified I values and modified Q values, and for summing the modified I values and modified Q values to output variation data; a memory for storing the variation data; a domain transformer for performing domain transform on the variation data to output a transformed value; and a comparator for comparing the transformed value to a threshold value for determining the presence of a peak at the tap.

36 Claims, 11 Drawing Sheets

METHOD AND SYSTEM FOR LOCATING A GPS CORRELATED PEAK SIGNAL

BACKGROUND OF THE INVENTION

1. Technical Field

The present invention relates generally to a global positioning system (GPS), in particular, a receiver for use in a GPS and a method thereof.

2. Discussion of Related Art

A Global Positioning System (GPS) receiver determines its position by computing the distance from and relative times of arrival of signals transmitted simultaneously from a number of GPS satellites. These satellites transmit, as part of their message, both satellite positioning data including pseudo-random codes as well as data on clock timing.

Using the received pseudo-random codes, the GPS receiver determine pseudoranges to the various GPS satellites, and computes the position of the receiver using these pseudoranges and satellite timing and data on clock timing. The pseudoranges are time delay values measured between the received signals from each satellite and a local clock signal. Usually GPS signals from four or more satellites are received. The satellite data on clock timing and signature data is extracted from the GPS signals once a satellite is acquired and tracked. Acquiring GPS signals can take up to several seconds and must be accomplished with a sufficiently strong received signal to achieve low error rates.

GPS signals contain high rate repetitive signals called pseudorandom (PN) codes. The codes available for civilian applications are called C/A (coarse/acquisition) codes, and have a binary phase-reversal rate, or "chipping" rate, of 1.023 MHz and a repetition period of 1023 chips for a code period of 1 millisecond. The codes sequences belong to a family known as Gold codes, and each GPS satellite broadcasts a signal with a unique Gold code.

Most GPS receivers use correlation methods to compute pseudoranges. A correlator multiplies the received signal by a stored replica of the appropriate Gold code contained within its local memory, and then integrates the product to obtain a correlation or sampling value, which is used as indication of the presence of the satellite signal. By sequentially adjusting the relative timing of this stored replica relative to the received signal, and observing the correlation output, the receiver can determine the time delay between the received signal and a local clock. The initial determination of the presence of such an output is termed "acquisition." Once acquisition occurs, the process enters the "tracking" phase in which the timing of the local reference is adjusted in small amounts to maintain a high correlation output.

Global Position Satellite Systems utilize a multiplicity of satellites (constellation) to simultaneously transmit signals to a receiver to permit position location of the receiver by measurement of time-differences of arrival between these multiple signals. In general, the signals from the different satellites do not significantly interfere with one another, since they utilize different pseudorandom spreading codes that are nearly orthogonal to one another. This low interference condition depends upon the power levels (amplitudes) of the received signals being similar to one another.

To reduce acquisition time, a GPS receiver uses several channels to handle signals that may come from several satellites. Each channel includes multi-correlation taps for use in the correlation operations. Typically, the data received at each correlation tap is stored in a memory. The stored data is processed and correlated. The size of the memory is proportional to the number of channels and taps. To reduce acquisition time, memory having sufficient capacity and speed is needed. However as a memory component ratio in the GPS receiver increases, it becomes more difficult to miniaturize the GPS receiver.

FIG. 1 shows a block diagram of a conventional GPS receiver having an antenna 1, a down converter 2, a local oscillator 3, and an A/D converter 4, receiver channels 5, a receiver processor 6, a navigation processor 7, and a user interface 8. In operation, the antenna 1 receives signals through the air transmitted from a constellation of satellites. The down converter 2 converts the high frequency signal received at the antenna 1 to a lower intermediate frequency (IF) signal by mixing the signals with a local oscillation signal generated by the local oscillator 3. The A/D converter 4 converts the analog IF signals to digital signals for processing by the receiver channels 5. The IF signals received at the receiver channels 5 is processed by the receiver channels 5, the receiver processor 6 and the navigation processor 7. The receiver channels 5 have N channels and the N channels can be set by a manufacturer. The primary functions of the receiver processor 6 include generating a plurality of pseudoranges for each satellite and perform the correlation operation with the in-phase (I) and quadrature-phase (Q) data of each channel. The navigation processor 7 sets a position value using different pseudoranges for the different satellites. The user interface 8 is used to display the position data.

FIG. 2 shows a block diagram of one of the N channels in receiver channel 5 of FIG. 1. The digital IF signals received from the AND converter 4 of FIG. 1 are fed to in-phase/quadrature-phase multipliers 10 wherein the IF signals are multiplied with signals generated by in-phase sine map 11 and quadrature-phase cosine map 12 or quadrature-phase sine map 11 and in-phase cosine map 12, each of which is in turn generated by a Numerical Code Oscillator (NCO) 19. The output of the in-phase/quadrature-phase multipliers 10 are in-phase IF signals corresponding to the phase of sine map 11 and quadrature-phase IF signals corresponding to the phase of cosine map 12 or the output of the in-phase/quadrature-phase multipliers 10 are quadrature-phase IF signals corresponding to the phase of sine map 11 and in-phase IF signals corresponding to the phase of cosine map 12. The receiver processor 6 generates the numerical code for controlling the NCO 19 for generating a Doppler frequency. The receiver processor 6 also generates a clock control signal input to code NCO 18 for interlocking the PN code generator 16. Pseudo-random codes associated with the satellites are generated by the PN code generator 16. The PN codes are shifted by code shifters 17 and output to a plurality of correlators 13. Correlation is performed using the correlators 13 by comparing the phase shifted PN codes to the I and Q data received from the in-phase/quadrature-phase multipliers 10. The correlated I and Q data from the correlators 13 are output to an integrator 14 wherein the correlated I and Q values are integrated. The integrated values, also known as sampling values, are stored in memory 15. Typically, each channel of the N channels of receiver channels 5 stores in memory 15 all sampling values sampled by the integrator 14 for a given duration, such as 1 millisecond for each tap. Upon collection of a predetermined number of samples, the sampled values are forwarded to an FFT unit 20 wherein fast Fourier transform is performed to determine if a peak (correlation) exists for this tap. If a peak is found, the receiver processor 6 extracts the frequency and code value information from the tap to calculate pseudoranges for acquisition.

If it is determined that a peak does not exist in the sampled tap, the sampling, correlation, and FFT processing is repeated for each tap until the peak tap is located.

It can be seen from this process that a large amount of data need to be stored in the receiver memory 15. Thus, memory having sufficient capacity is needed. Further, because of the need to access memory data for processing, memory access time is an important factor affecting acquisition speed and thus performance of the receiver.

SUMMARY OF THE INVENTION

A global positioning system (GPS) receiver is provided, comprising a converter for converting received GPS signals to in-phase (I) and quadrature-phase (Q) digital signals; a correlator for generating expected codes and correlating the I and Q digital signals with the expected codes to output sampled I values and sampled Q values for a tap; a filter for filtering the sampled I values and sampled Q values to modified I values and modified Q values, and for summing the modified I values and modified Q values to output variation data; a memory for storing the variation data; a domain transformer for performing domain transform on the variation data to output a transformed value; and a comparator for comparing the transformed value to a threshold value for determining the presence of a peak at the tap.

The sampled I values and sampled Q values are modified by assigning a positive value to the sampled I value or sampled Q value when a present sample I value or Q value has a different sign from the immediately prior sample I value or sample Q value.

Preferably, the modified I values and modified Q values are fractional reductions of respective sampled I values and sampled Q values, the fractional reduction being the same for both the sampled I values and the sampled Q values, wherein the fractional reduction is one half.

According to an aspect of the invention, the filter includes a pair of delay elements and a pair of single bit comparators, wherein the delay elements delay a sign bit of the sampled I value and the sampled Q value to output a prior sign value, and the single bit comparators compare a sign of the present sampled Q value with the prior sign value to provide a positive output if the present and the prior sign values are different, wherein the filter further includes an adder for performing the summing operation on the modified I value with the modified Q value, including the sign bits.

Preferably, the domain transformer is a Fast Fourier Transformer. The memory further stores the sampled I and Q values of the tap identified as having a peak, wherein the memory is one of a SRAM and a DRAM.

According to another aspect of the invention, a global positioning system (GPS) receiver is provided, comprising a converter for converting received GPS signals of a tap to in-phase (I) and quadrature-phase (Q) digital signals; a correlator for correlating the I and Q digital signals with expected codes to output sampled I values and sampled Q values, each of the sampled I values and sampled Q values having a sign bit for signifying direction; a filter for filtering at least the sign bits of the sampled I values and sampled Q values and determining whether a potential peak exists at the tap based on the number of change in directions in the sign bits of the sampled I values and sampled Q values; a domain transformer for performing domain transform on data derived from the sampled I values and sampled Q values of the tap determined to have a potential peak and outputting a transformed value; and a comparator for comparing the transformed value to a threshold value for determining the presence of a peak at the tap. A memory is provided for storing the data derived from the sampled I values and sampled Q values of the tap determined to have a potential peak, wherein the memory is one of a SRAM and a DRAM.

Preferably, the data is derived from the sampled I values and sampled Q values by adding sign-modified I values to sign-modified Q values, wherein the sampled I values and sampled Q values are filtered by assigning a positive value to the sampled I value or sampled Q value when a present sample I value or Q value has a different sign from the immediately prior sample I value or sample Q value. The filtered I values and filtered Q values can be fractional reductions of respective sampled I values and sampled Q values, the fractional reduction being the same for both the sampled I values and the sampled Q values. The filter includes a pair of delay elements and a pair of single bit comparators, wherein the delay elements delay a sign bit of the sampled I value and the sampled Q value to output a prior sign value, and the single bit comparators compare a sign of the present sampled Q value with the prior sign value to provide a positive output if the present and the prior sign values are different.

A method for processing global positioning system (GPS) signals is also provided for determining position, comprising of a receiving GPS signals from one or more satellites; converting the received GPS signals to in-phase (I) and quadrature-phase (Q) digital signals of a tap; generating expected codes and correlating the I and Q digital signals with the expected codes to output sampled I values and sampled Q values; filtering the sampled I values and sampled Q values to modified I values and modified Q values, and summing the modified I values and modified Q values to output variation data; storing in memory the variation data; performing domain transform on the variation data to output a transformed value; and comparing the transformed value to a threshold value for determining the presence of a peak at the tap.

The sampled I values and sampled Q values can be modified by assigning a negative value to the sampled I value or sampled Q value when a present sampled I value or Q value has a different sign from the immediately prior sampled I value or sampled Q value. The modified I values and modified Q values can be fractional reductions of respective sampled I values and sampled Q values, the fractional reduction being the same for both the sampled I values and the sampled Q values, wherein the fractional reduction is one half. The step of filtering can include delaying a sign bit of the sampled I value and the sampled Q value to output a prior sign value, and comparing a sign of the present sampled Q value with the prior sign value to provide a negative output if the present and the prior sign values are different, and further includes summing the modified I value with the modified Q value, including the sign bits.

The method further includes storing in the memory the sampled I and Q values of the tap identified as having a peak and discarding sampled I and Q values of other taps.

Another method for processing global positioning system (GPS) signals is provided, comprising of a converting received GPS signals of a tap to in-phase (I) and quadrature-phase (Q) digital signals; correlating the I and Q digital signals with expected codes to output sampled I values and sampled Q values, each of the sampled I values and sampled Q values having a sign bit for signifying direction; filtering at least the sign bits of the sampled I values and sampled Q values and determining whether a potential peak exists at the tap based on the number of change in directions in the sign bits of the sampled I values and sampled Q values; performing domain transform on data derived from the sampled I values and sampled Q values of the tap determined to have a potential peak and outputting a transformed value; and comparing the transformed value to a threshold value for determining the presence of a peak at the tap.

The method preferably further includes storing in a memory the data derived from the sampled I values and sampled Q values of the tap determined to have a potential peak.

According to still another aspect of the invention, a stored program device having stored codes executable by a processor to perform method steps for processing GPS signals is also provided, the method comprising of a correlating I and Q digital signals with expected codes to output sampled I values and sampled Q values, each of the sampled I values and sampled Q values having a sign bit for signifying direction; filtering at least the sign bits of the sampled I values and sampled Q values and determining whether a potential peak exists at the tap based on the number of change in directions in the sign bits of the sampled I values and sampled Q values; performing domain transform on data derived from the sampled I values and sampled Q values of the tap determined to have a potential peak and outputting a transformed value; and comparing the transformed value to a threshold value for determining the presence of a peak at the tap.

BRIEF DESCRIPTION OF THE DRAWINGS

The embodiments of the present invention will become more apparent when detail description of embodiments are read with reference to the accompanying drawings in which.

DETAILED DESCRIPTION OF PREFERRED EMBODIMENTS

Figure 1:
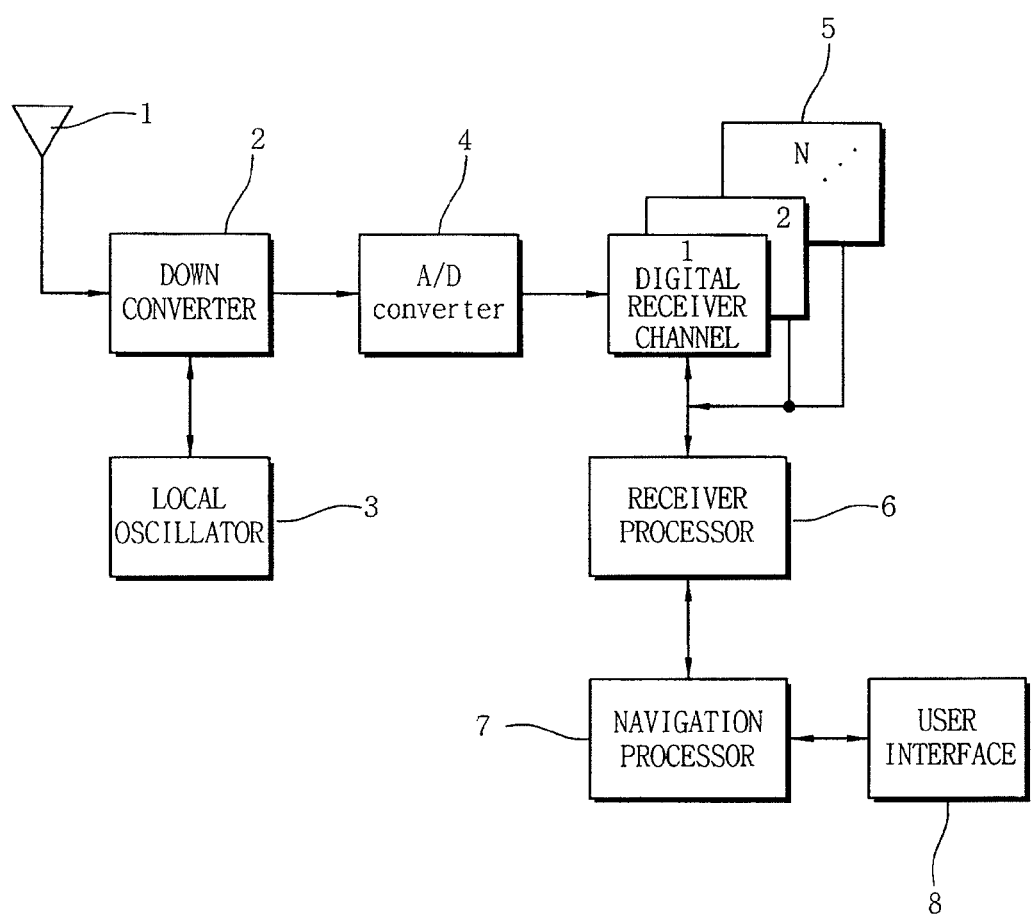
FIG. 1 shows a block diagram of a conventional GPS receiver.

Hereinafter, preferred embodiments of the present invention will be described in detail with reference to the accompanying drawings. It should be noted that like reference numerals are used for designation of like or equivalent parts or portion for simplicity of illustration and explanation.

Figure 2:
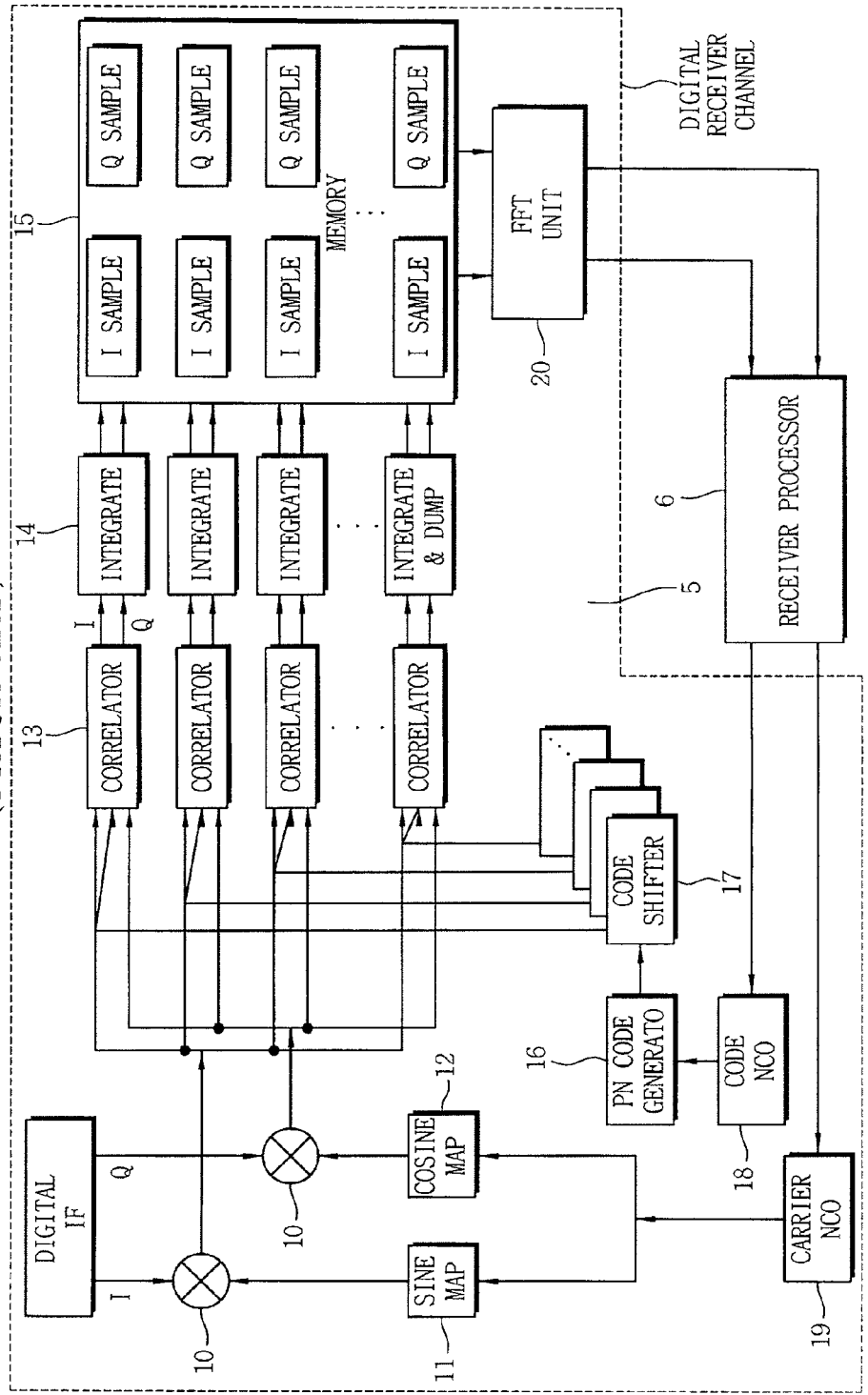
FIG. 2 shows a block diagram of one of the N channels in receiver channels 5 of FIG. 1.
Figure 3:
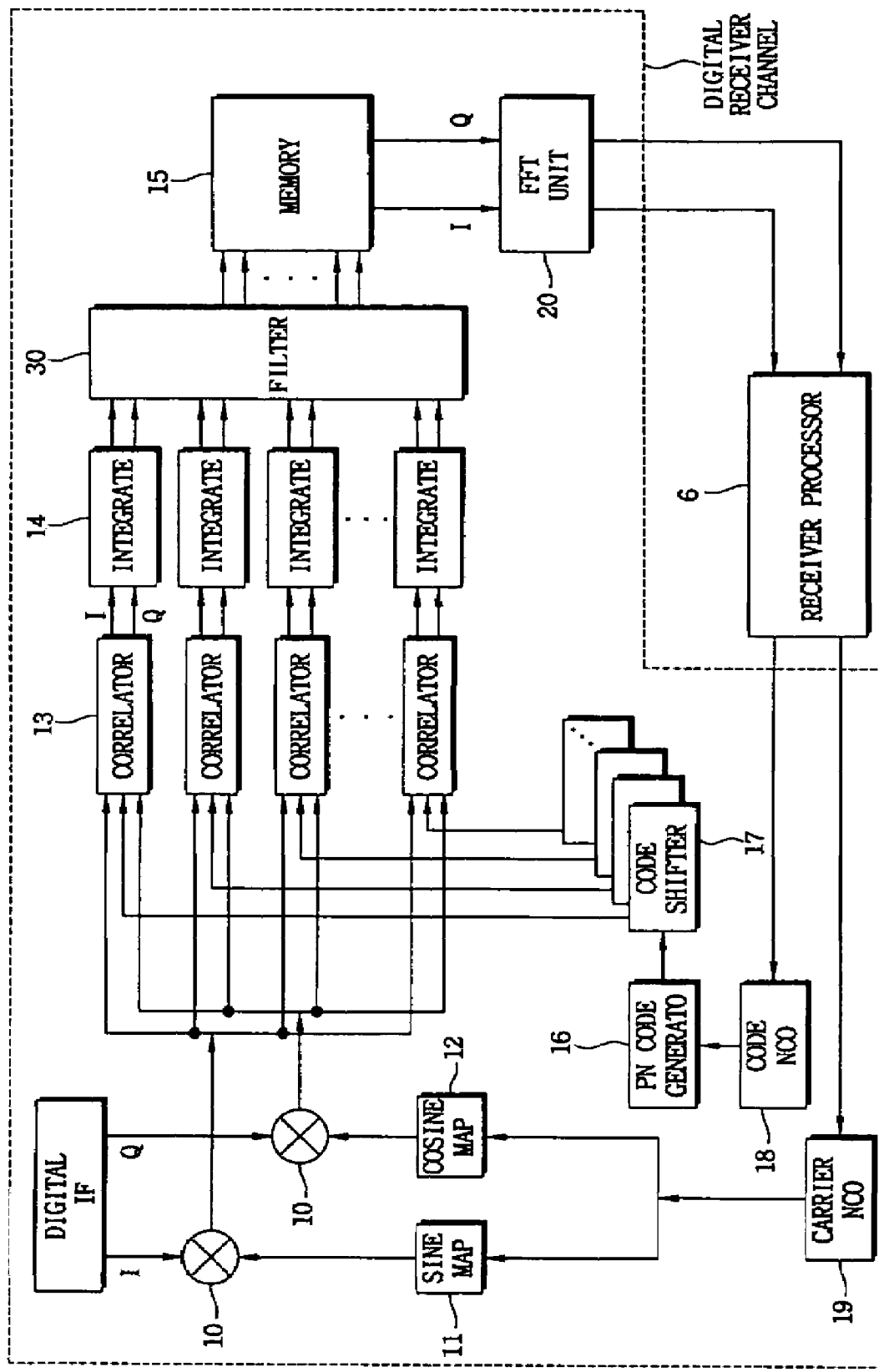
FIG. 3 shows a block diagram of a GPS receiver according to an embodiment of the present invention.

FIG. 3 shows a block diagram of a GPS receiver according to an embodiment of the present invention. The components of the receiver shown in FIG. 3, other than a filter 30, perform the functions described above for the components of FIG. 2. The filter 30 is configured to receive the sampling I and Q values output from the integrator 14. According to at least one embodiment of the present invention, the filter 30 modifies the sampled I and Q values so that a data set that is reduced from the sampled values are chosen for storage in memory 15. According to another embodiment of the present invention, the filter 30 extracts the correlation characteristics of the sampled I and Q values and selectively stores the I and Q values or modified I and Q values based on a screening process. The I and Q sampling values of a tap determined to not have a peak are discarded and they are not stored in memory. Processing of the stored data by the FFT unit 20 to determine the existence of a peak tap is more efficient because of the reduced data set and the capacity requirement of the memory 15 is also reduced, thereby reducing power consumption and the physical size of memory 15.

Figure 4:
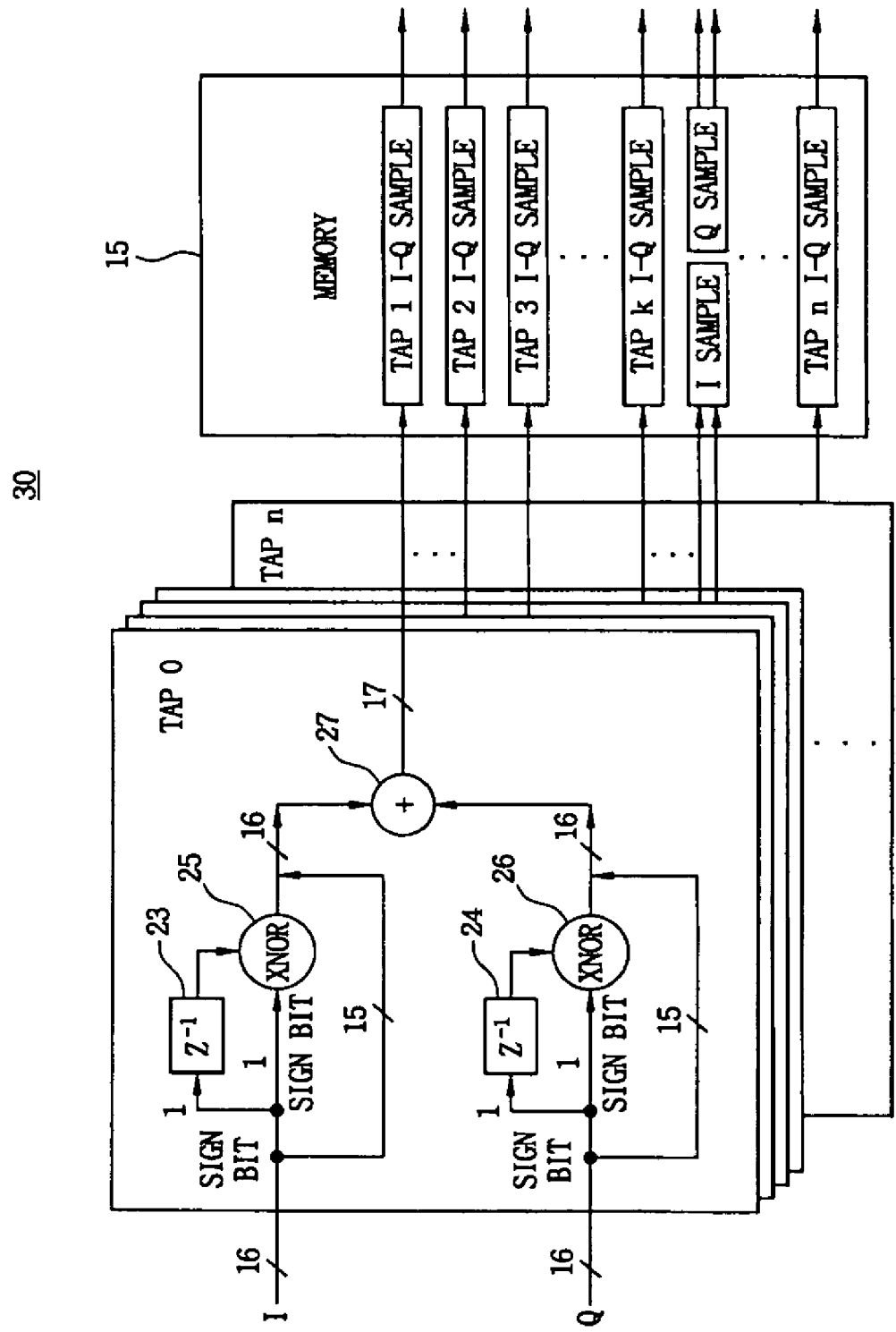
FIG. 4 shows an exemplary implementation of filter 30 of FIG. 3.

FIG. 4 shows an exemplary implementation of the filter 30 of FIG. 3. The sampled I and Q values output from integrator 14 is input to a pair of delay elements 23, 24 and sign bit comparators 25, 26. For purposes of illustrating embodiments of the present invention, the sampled I and Q values are selected to be 16 bits, the duration of sampling is selected to be 1 millisecond, and each sample frame is chosen to be 16 samples. It is to be appreciated that different bit numbers, sampling durations, and sampling frame can be used without departing from the present invention. As shown in FIG. 4, each of 16 bits of data representing sampled I and Q values plus one sign bit is input to one of n-taps of the filter 30. The circuit of tap 0 is shown in FIG. 4. The sign bit is input to the delay element 23 which delays for one clock period the sign bit before it is entered into the sign bit comparator 25. The sign bit comparator 25 facilitates the comparison of the sign values of the prior sampled I data with the present sampled I data. The sign bit comparator 25 outputs a logic 0, signifying a positive number, if the present sign bit is different from the prior sign bit. The delay element 24 and the sign bit comparator 26 perform the above described functions for the sampled Q data. Thus, the sampled I and Q data are modified in their sign (or direction) depending on the direction of the sampling data with respect to time. The modified I and Q data are input to an accumulator 27 wherein the modified I and Q data including their sign bits are added. The accumulated data is 'variation data'.

According to the present embodiment, the 16 variation data accumulated from the modified I and Q values are output for storage in memory 15. The stored data is then used by the FFT unit 20 to perform a Fourier transform for determining whether an actual peak exist in this tap. The sign bit comparators 25 and 26 are preferably implemented by using an exclusive nor (xnor) logic. It is to be appreciated that the sign bit comparators can also be implemented using an exclusive or (xor) logic and in such embodiment the comparison will result in a negative value (logic 1). When the present sample value and the prior sample value have same signs with using the xnor logic or when the present sample value and the prior sample value have different signs with using the xor logic, the counter 28 counts the number of logic 1. If a peak is not formed for this tap, the above described process is repeated for the next tap.

Figure 5:
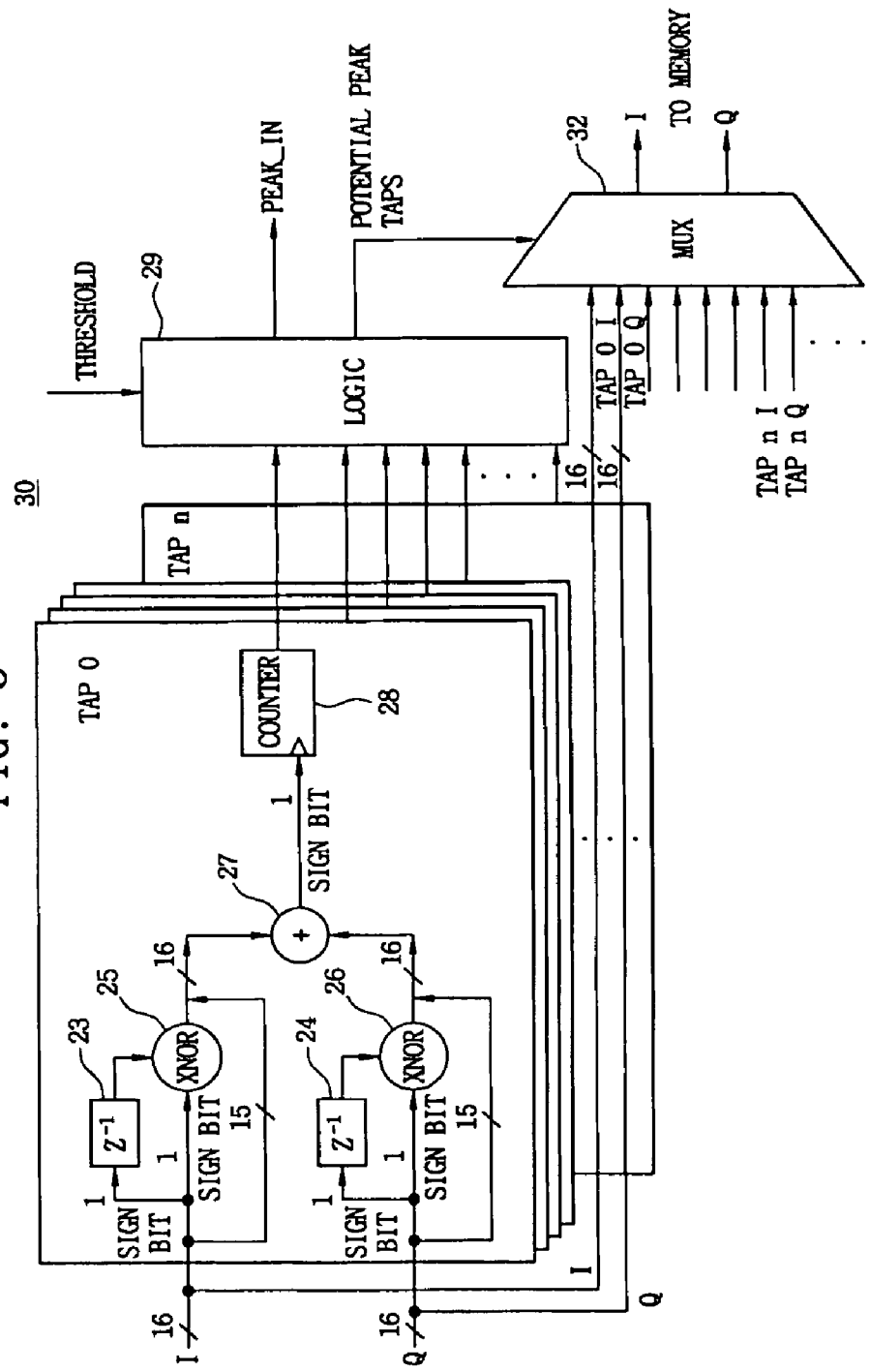
FIG. 5 shows another exemplary implementation of filter 30 of FIG. 3.

FIG. 5 shows another exemplary implementation of the filter 30 of FIG. 3 according to an alternative embodiment of the present invention. Referring to FIG. 5, whenever a negative value result from the accumulation of the modified I and Q values in the accumulator 27, a logic one signal is output to a counter 28 to increment a count for this tap. The counter 28 is reset to zero at the beginning of data sampling for each tap. Upon completion of a sampled frame, e.g. 16 samples, the final count is compared against a preset threshold in the logic circuit 29. If the count value exceeds the preset threshold, for example, 12 out of 16, data from tap 0 is considered as a potential peak. In such case, the sampled I and Q values of the tap in question is stored in memory 15. The stored data is then processed by the FFT unit 20 and the receiver processor 6 to determine if a peak exists in this tap. If the count value for any particular tap does not exceed the preset threshold, the sampled I and Q values, the modified I and Q data, and the variation data are not stored in the memory 15. These data can be discarded.

Figure 6:
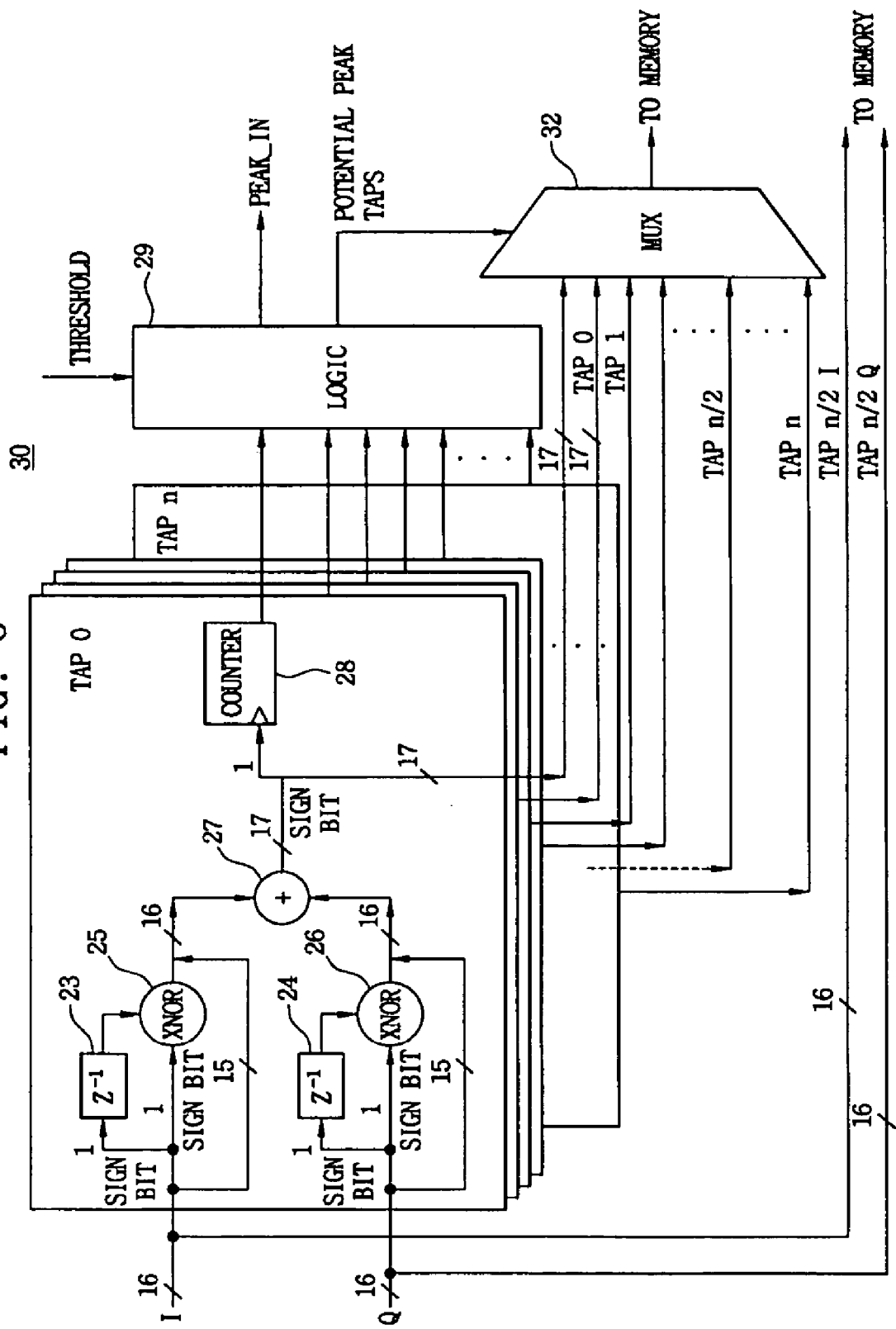
FIG. 6 shows still another exemplary implementation of the filter 30 of FIG. 3.

FIG. 6 shows still another exemplary implementation of the filter 30 of FIG. 3 according to an alternative embodiment of the present invention. Referring to FIG. 6, upon indication of a count value exceeding the present threshold, as determined by the logic 29, the variation data output from the accumulator 27 is output to be stored in memory 15 instead of the sampled I and Q values. According to this embodiment, the variation data of a potential peak tap is stored and processed by the FFT unit 20 and the receiver processor 6. Thus, the dataset stored in memory 15 is a further reduction from the dataset of the sampled I and Q values output from the integrator 14.

Table 1 lists exemplary data received from a tap and the processing of the data by the filter 30 according to an embodiment of the present invention.

In table 1, 16 samples of sampled I and Q values output from the integrator 14 and received at the filter 30 are shown in columns I and Q. The modified I and Q values are shown in columns I' and Q', respectively. As shown therein, the sign of each sample value is assigned a positive value when there is a change in the sign between the present sample value and the prior sample value of I and Q. The I and Q values are modified by the delay element 23 and the sign comparator 25 for the sampled I values and the delay element 24 and sign comparator 26 for the Q sample values. The modified I and Q values, I' and Q', are added by accumulator 27 to output variation value. This sum is shown in Table 1 in the column labeled as Variation Value (I'+Q'). The sum operation in accumulator 27 adds the magnitude of I' and Q', taking into account the sign of both I' and Q' values. For each occurrence of a negative value output from the accumulator 27, a transition is sent to the counter 28 to increment the counter value. As shown in the count value column of Table 1, the count value for the data from this tap is 7 out of a frame of 16 samples. This signifies that there were 7 negative values from the summation of the modified I' and Q' sample values. Table 1 shows data for a tap which does not have a peak.

Figure 7:
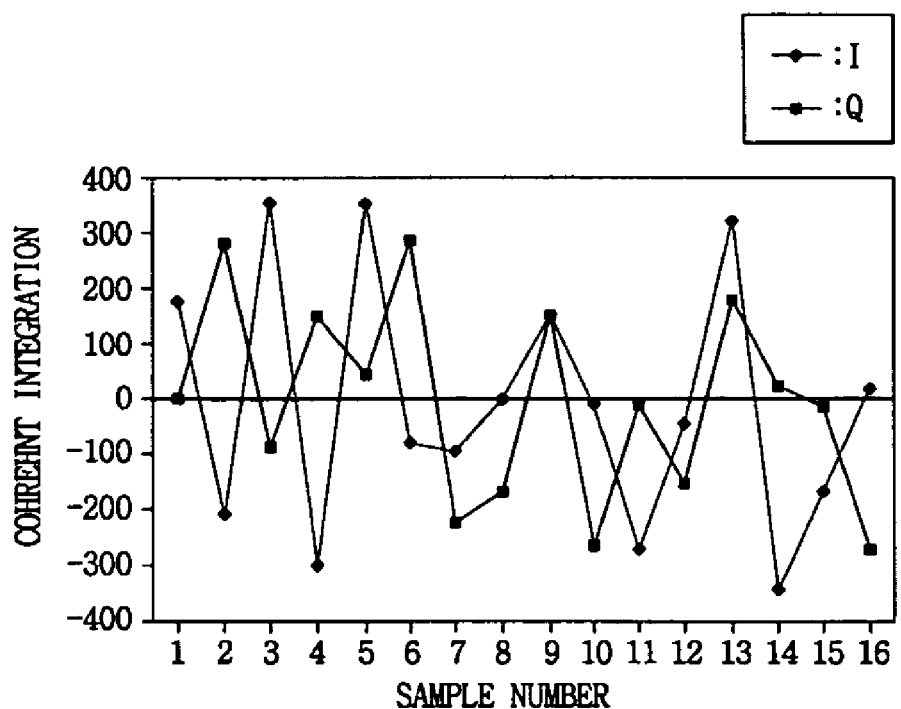
FIG. 7 shows a plot of the 16 sets of I and Q sampled values listed in Table I.

One ordinary skilled in the art recognizes that for the existence of a peak in a tap, the sampled I and Q values will appear as two clusters, one for the sampled I values and one for the sampled Q values. FIG. 7 shows both sampled I and Q values swinging in different directions around the zero axis. One ordinary skilled in the art viewing the plot shown in FIG. 7 would recognize that the tap under question does not have a peak.

According to embodiments of the present invention and as shown in Table 1, the count value is a measure of the number of change in direction of the sampled I and Q values between the zero axis. Thus, a count of seven (7) out of sixteen (16) dataset can be construed as a dataset having data points which swing in different directions around the zero axis and are not clustered away from the zero axis. From the count value of 7 out of 16, the tap can be dismissed as one not having a peak.

TABLE 1

The variation value generation table in the case a peak tap does not exist.

| — | I (same phase sample value) | Q (quadrature phase sample value) | I + Q | I' modified value | Q' modified value | Variation Value I' + Q' | Count value (Sign bit value of (I' + Q')) |
|---|---|---|---|---|---|---|---|
| 1 | 174 | −6 | 168 | −174 | −6 | −180 | 1 |
| 2 | −214 | 280 | 66 | 214 | 280 | 494 | 0 |
| 3 | 360 | −88 | 272 | 360 | 88 | 448 | 0 |
| 4 | −297 | 154 | −143 | 297 | 154 | 451 | 0 |
| 5 | 353 | 43 | 396 | 353 | −43 | 310 | 0 |
| 6 | −84 | 289 | 205 | 84 | −289 | −205 | 1 |
| 7 | −95 | −255 | −350 | −95 | 255 | 160 | 0 |
| 8 | −4 | −172 | −176 | −4 | −172 | −176 | 1 |
| 9 | 153 | 158 | 311 | 153 | 158 | 311 | 0 |
| 10 | −11 | −267 | −278 | 11 | 267 | 278 | 0 |
| 11 | −267 | −19 | −286 | −267 | −19 | −286 | 1 |
| 12 | −44 | −152 | −196 | −44 | −152 | −196 | 1 |
| 13 | 324 | 182 | 506 | 324 | 182 | 506 | 0 |
| 14 | −346 | 21 | −325 | 346 | −21 | 325 | 0 |
| 15 | −167 | −24 | −188 | −167 | 24 | −143 | 1 |
| 16 | 20 | −276 | −256 | 20 | −276 | −256 | 1 |
| | | | | | | Number of 1's | 7 |

TABLE II

| | I (same phase sample value) | Q (quadrature phase sample value) | I + Q | I' modified value | Q' modified value | Variation Value I' + Q' | Count value (Sign bit value of (I' + Q')) |
|---|---|---|---|---|---|---|---|
| 1 | 11000 | 389 | 11389 | −11000 | −389 | −11389 | 1 |
| 2 | 11100 | −363 | 10737 | −11100 | 363 | −10737 | 1 |
| 3 | 11300 | −717 | 10583 | −11300 | −717 | −12017 | 1 |
| 4 | 10900 | −1670 | 9230 | −10900 | −1670 | −12570 | 1 |
| 5 | 10800 | −2620 | 8180 | −10800 | −2620 | −13420 | 1 |
| 6 | 10700 | −2990 | 7710 | −10700 | −2990 | −13690 | 1 |
| 7 | 10500 | −3440 | 7060 | −10500 | −3440 | −13940 | 1 |
| 8 | 10200 | −4440 | 5760 | −10200 | −4440 | −14640 | 1 |
| 9 | 9920 | −5300 | 4620 | −9920 | −5300 | −15220 | 1 |
| 10 | 9790 | −5220 | 4570 | −9790 | −5220 | −15010 | 1 |
| 11 | 9240 | −6000 | 3240 | −9240 | −6000 | −15240 | 1 |
| 12 | 8670 | −6910 | 1760 | −8670 | −6910 | −15580 | 1 |
| 13 | 8200 | −7410 | 740 | −8200 | −7410 | −15610 | 1 |
| 14 | 8070 | −7460 | 610 | −8070 | −7460 | −15530 | 1 |
| 15 | 7240 | −8120 | −880 | −7240 | −8120 | −15360 | 1 |
| 16 | 6590 | −8870 | −2280 | −6590 | −8870 | −15460 | 1 |
| | | | | | | Number of 1's | 16 |

Table II shows sampled I and Q values from a tap having a peak. As can be seen from Table II, the sampled I and Q values are clustered largely in the same direction throughout the 16 samples. It can also be seen that the modified I and Q sampled values (I' and Q'), as modified by the filter shown in FIG. 4, result in modified I and Q values with a negative sign essentially throughout the 16 samples for both I' and Q' signaling little or no change in direction of the I and Q sample values. Therefore, the output of the accumulator 27 (I'+Q') result in a larger negative value that is clustered well above the zero axis. Since each variation value (I'+Q') is negative, the counter is counted 16 times to result in a count value of 16. This is recognized as a tap having a peak.

Figure 8:
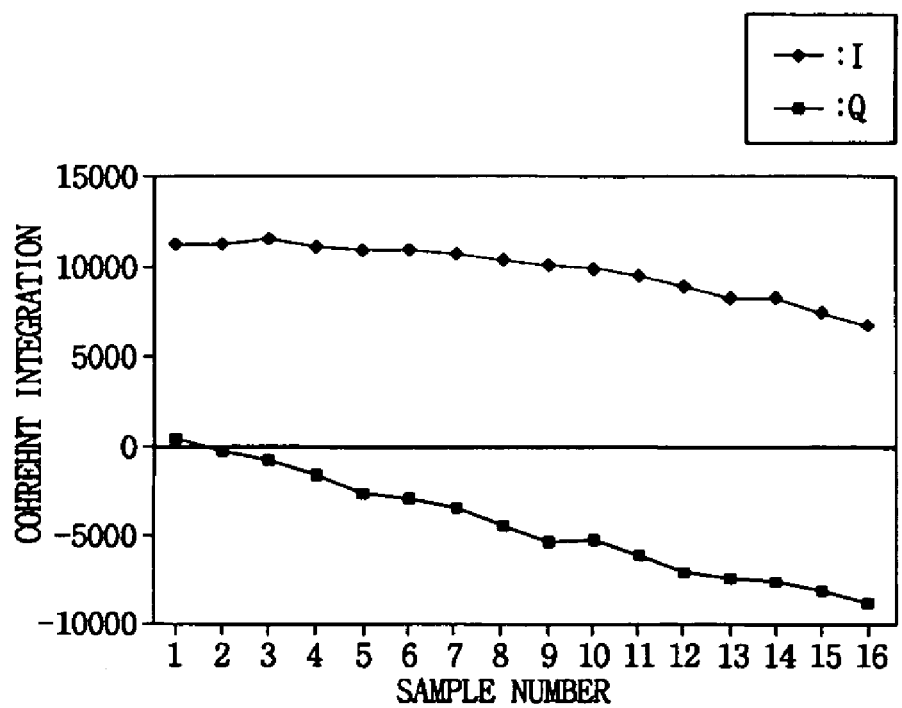
FIG. 8 shows a plot of 16 sets of I and Q sampled values listed in Table II.

FIG. 8 shows a plot of the sampled I and Q values listed in Table II. It can be seen that there are two clusters of data, one for the I sampled values and the other for the Q sampled values.

According to an embodiment of the present invention, to determine whether a peak existence at a particular tap, the variation values (I'+Q') are stored in memory 15, and stored variation values are processed by the FFT unit 20 to search for the existence of a peak. Existence of a peak can be determined by the variation values transformed by the FFT unit 20 when compared against a value predetermined to define the existence of a peak. When a peak is determined to be present at a tap, the frequency, code values, and phase offsets are extracted from the sampled I and Q values and pseuodoranges are calculated.

Alternatively, to further reduce the dataset, the sampled I and Q values are reduced by a fractional multiplier, such as by ½, ¼, etc. prior to its filtering and processing by the filter 30 and the FFT unit 20. The multiplier (not shown) can be part of the filter 30 or disposed between the integrator 14 and the filter 30.

Figure 9:
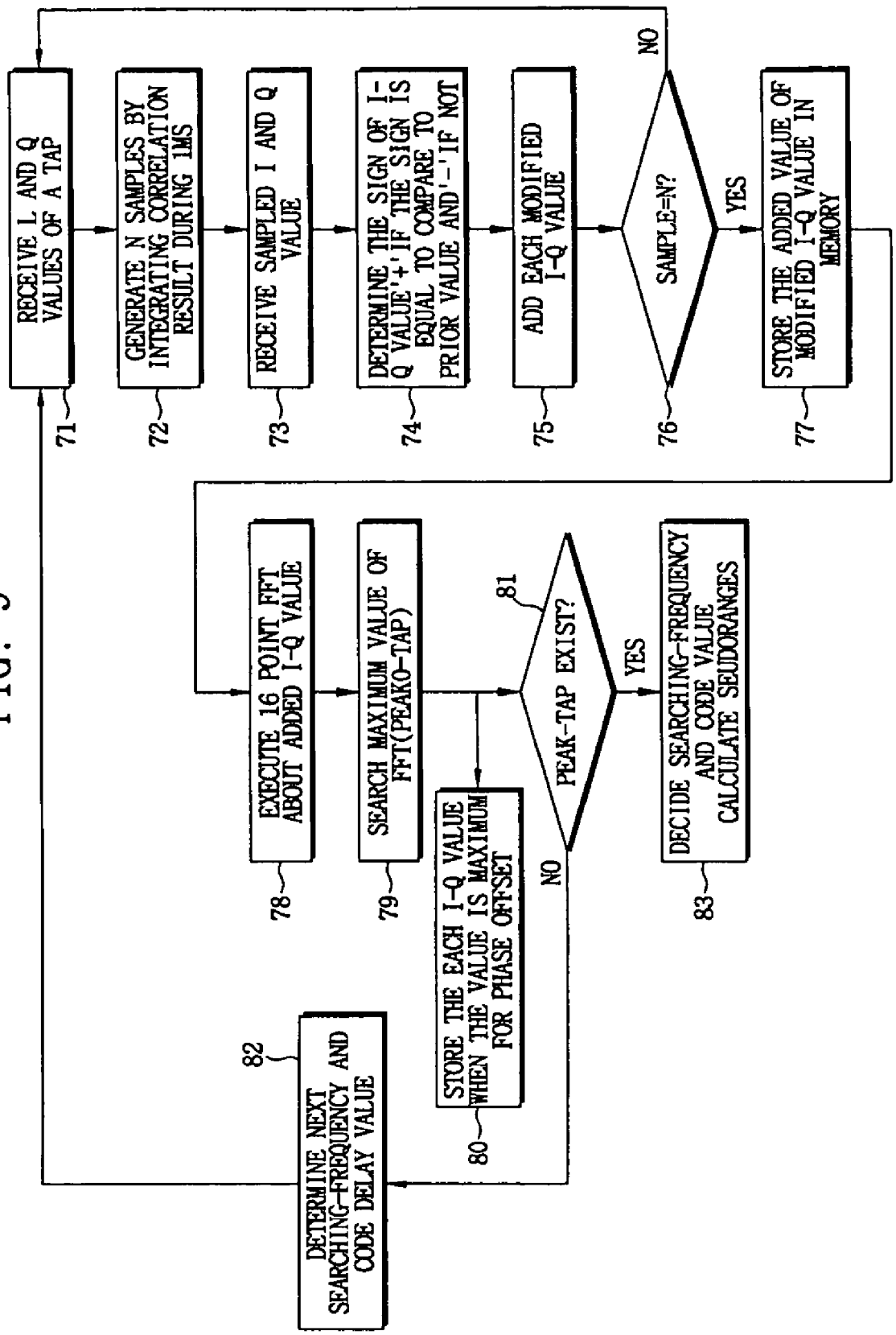
FIG. 9 is a flow diagram of a method of processing GPS signals according to an embodiment of the present invention.

FIG. 9 illustrates the process flow of data received from a tap to determine the existence of a peak according to an embodiment of the present invention. As shown, the receiver according this embodiment of the present invention receives I and Q values at a tap at step 71. N samples of integrated correlation values (sampled values) are output to the filter 30 at step 72. According to the illustrative embodiment, N is equal to 16 and the duration of integration is 1 millisecond. The sampled I and Q values are received at the filter 30 at step 73. The sampled I and Q values are modified to have a positive value when there is a change in the sign from the prior sample value to the present sample value at step 74. The modified I and Q values are added by the accumulator 27 at step 75. Upon reaching N samples of I and Q value pairs, at step 76, the accumulated modified I and Q values (variation values) are stored in memory 15 (step 77). The stored data is processed by the FFT unit 20 at step 78 and the FFT transformed value is compared against a given threshold to determine whether the maximum value is a peak value (step 79). Then, the I and Q values are stored when the value is maximum for phase offset of the code NCO 18 (step 80). Upon determination that a peak exists at step 81, the navigation processor 7 calculates pseudoranges, phase offset, etc. at step 83. When a peak does not exist at step 81, the process returns to step 71 to determine a next searching frequency and code delay value (step 82).

According to another embodiment of the present invention, the count value from the counter 28 of FIG. 5 and count values shown in Tables I and II are used to determine the existence of a peak at the corresponding tap. When a peak exists at a tap, a count value will be close to the number of samples and of the sampled I and Q values received. In this embodiment, the count value of a peak tap should approach 16. Thus, a threshold of, for example, 14 can be set and if the count value exceeds 14, decision is made that a peak exists at the present tap. According to this embodiment, sampled I and Q values are stored in memory 15 for processing. The sample I and Q values of taps found to not have a count value exceeding the threshold is determined to not have a peak and the corresponding I and Q sampled values are not stored in memory 15. These I and Q sampled values are not used for the acquisition operation and they are discarded.

Figure 10:
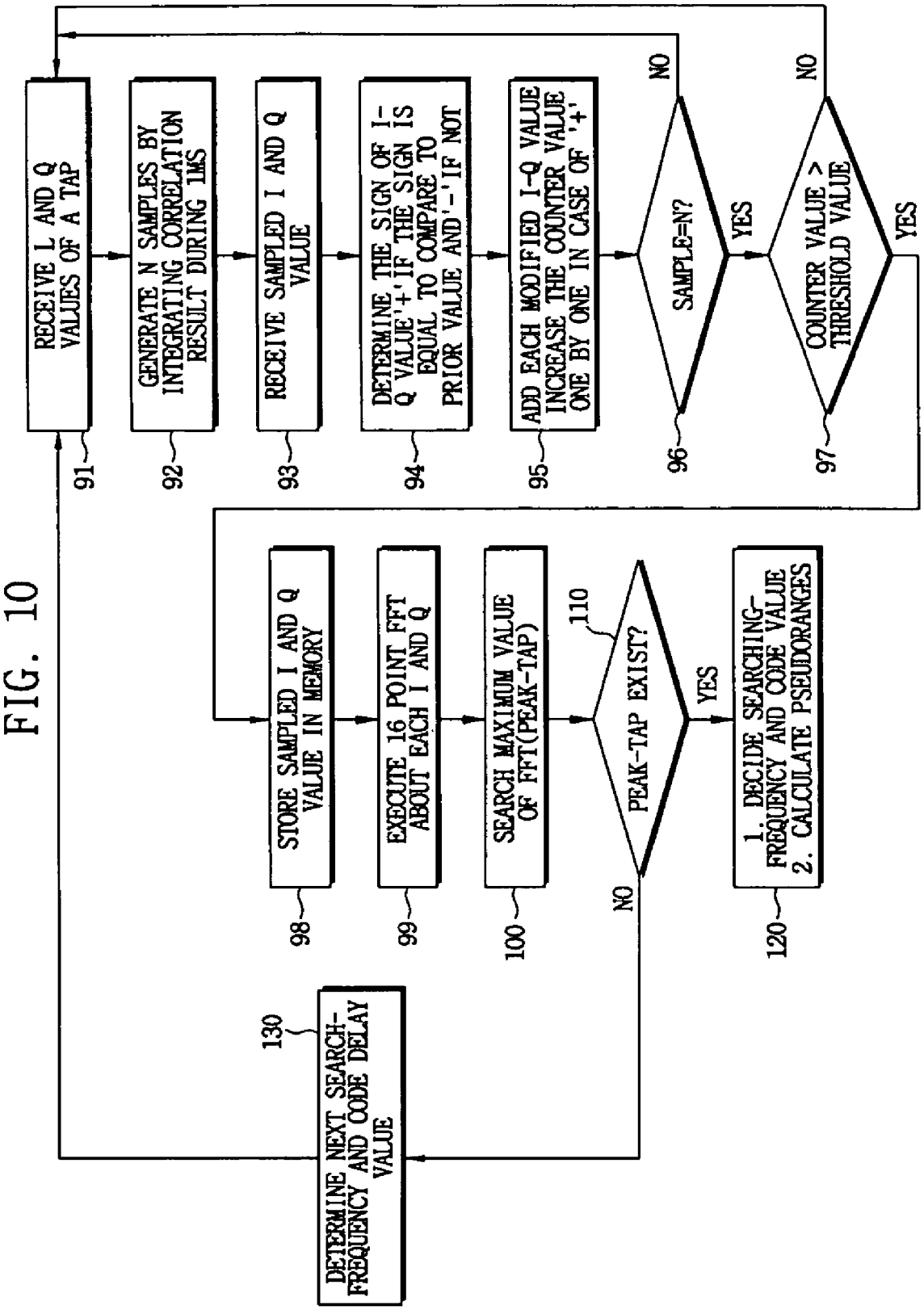
FIG. 10 is a flow diagram of a method of processing GPS signals according to an embodiment of the present invention.

FIG. 10 shows the exemplary process flow according to this embodiment. As shown, the receiver receives I and Q values of a tap at step 91. N samples of integrated correlation values (sampled values) output to the filter 30. The sampled I and Q values are received at the filter 30 at step 93. The sampled I and Q values are modified to have a positive value when there is a change in the sign from the prior sample value to the present sample value at step 94. The modified I and Q values are added at the accumulator 27 at step 95.

Upon reaching N samples of I and Q value pairs, at step 96, the counter value is compared against a preset threshold in logic 29 at step 97. If the count value equals or exceeds the preset threshold, the tap in question is considered a tap which potentially has a peak. In such instance, the sampled I and Q values are stored in memory 15 (step 92). The stored data is processed by the FFT unit 20 at step 78 and the FFT transformed value is compared against a given peak threshold to determine whether a peak exists at the tap (step 99). Upon determination that a peak exists at step 110, post processing to calculate pseudoranges, phase offset, etc. is performed at step 120. When a peak does not exist at step 110, the process is returned to step 91 to determine a next searching frequency and a code delay value (step 130).

Figure 11:
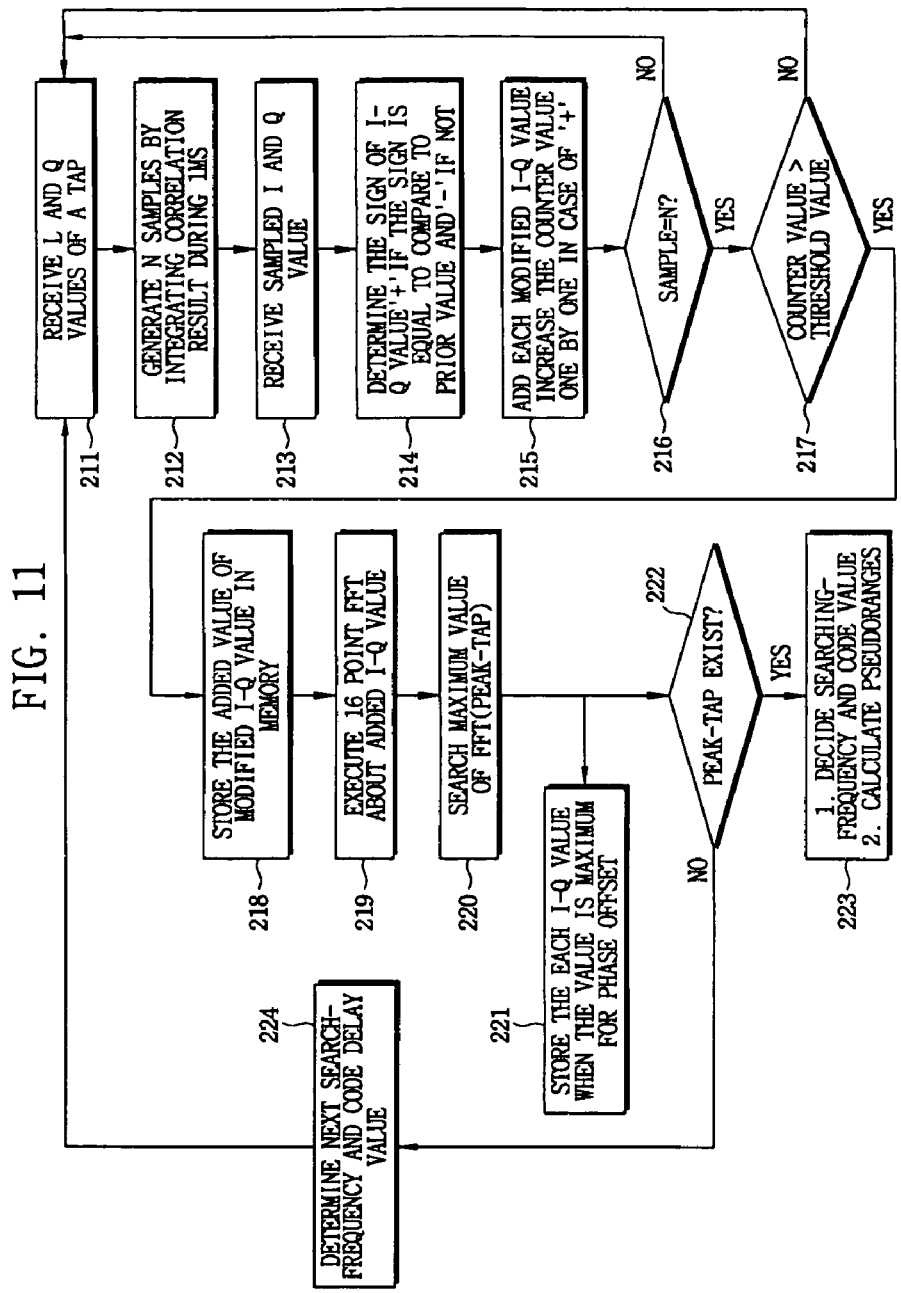
FIG. 11 is a flow diagram of a method of processing GPS signals according to an embodiment of the present invention.

FIG. 11 shows the exemplary process flow according to this embodiment. As shown, the receiver according this embodiment of the present invention receives I and Q values at a tap at step 211. N samples of integrated correlation values (sampled values) are output to the filter 15 at step 212. According to the illustrative embodiment, N is equal to 16 and the duration of integration is 1 millisecond. The sampled I and Q values are received at the filter 30 at step 213. The sampled I and Q values are modified to have a positive value when there is a change in the sign from the prior sample value to the present sample value at step 214. The modified I and Q values are added by the accumulator 27 at step 215. Upon reaching N samples of I and Q value pairs, at step 216, the counter value is compared against a preset threshold in logic 29 at step 217. If the count value equals or exceeds the preset threshold, the tap in question is considered a tap which potentially has a peak. In such instance, the accumulated I and Q values are stored in memory 15 (step 218). The stored data is processed by the FFT unit 20 at step 219 and the FFT transformed value is compared against a given peak threshold to determine whether a peak exists at the tap (step 220). And then, store I and Q values when the value is maximum for phase offset of the code NCO 18 (step 221). Upon determination that a peak exists at step 222, post processing to calculate pseudoranges, phase offset, etc. is performed at step 223. When a peak does not exist at step 222, determine a next searching frequency and a code delay value (step 224), and return to the step 211. According to an alternative embodiment of the present invention, using the filter 30 and the counter 28 as described above, the count value is used to determine the existence of a potential peak at the tap in question. Upon determination that the tap is a potential peak, instead of storing the sampled I and Q values as in the prior embodiment, the variation values (I'+Q') are stored in the memory 15. The stored data is then processed by the FFT unit 20 to determine whether a peak exists at the tap. According to this embodiment, the sampled I and Q values and variation values (I'+Q') of taps determined as not have a potential peek are not stored in memory 15 and these date are not processed. The memory 15 is a semiconductor memory, preferably one of a SRAM and DRAM.

To further reduce the dataset to be stored in memory 15, the sampled I and Q values can be reduced by multiplying with a fraction, such as ½, ¼, etc., prior to their processing by the filter 15. The multiplier/shifter (not shown) can be implemented before the values are entered into the accumulator 27 of FIG. 4. Table II shows the sampled I and Q values, the fractional modified I and Q values, the variation values (I ½+Q ½), and count values of a tap having a peak.

TABLE III

| — | I (same phase sample value) | Q (quadrature phase sample value) | I'/2 comparison value | Q'/2 comparison value | I'/2 + Q'/2 | Variation value (sign bit value of (I'/2 + Q'/2)) |
|---|---|---|---|---|---|---|
| 1 | 11000 | 389 | −5500 | −194.5 | −5694.5 | 1 |
| 2 | 11100 | −363 | −5550 | 181.5 | −5368.5 | 1 |
| 3 | 11300 | −717 | −5650 | −358.5 | −6008.5 | 1 |
| 4 | 10900 | −1670 | −5450 | −835 | −6285 | 1 |
| 5 | 10800 | −2620 | −5400 | −1310 | −6710 | 1 |
| 6 | 10700 | −2990 | −5350 | −1495 | −6845 | 1 |
| 7 | 10500 | −3440 | −5250 | −1720 | −6970 | 1 |
| 8 | 10200 | −4440 | −5100 | −2220 | −7320 | 1 |
| 9 | 9920 | −5300 | −4960 | −2650 | −7610 | 1 |
| 10 | 9790 | −5220 | −4895 | −2610 | −7505 | 1 |
| 11 | 9240 | −6000 | −4620 | −3000 | −7620 | 1 |
| 12 | 8670 | −6910 | −4335 | −3455 | −7790 | 1 |
| 13 | 8200 | −7410 | −4100 | −3705 | −7805 | 1 |
| 14 | 8070 | −7460 | −4035 | −3730 | −7765 | 1 |
| 15 | 7240 | −8120 | −3620 | −4060 | −7680 | 1 |
| 16 | 6590 | −8870 | −3295 | −4435 | −7730 | 1 |
| | | | | | Number of 1's | 16 |

Figure 12:
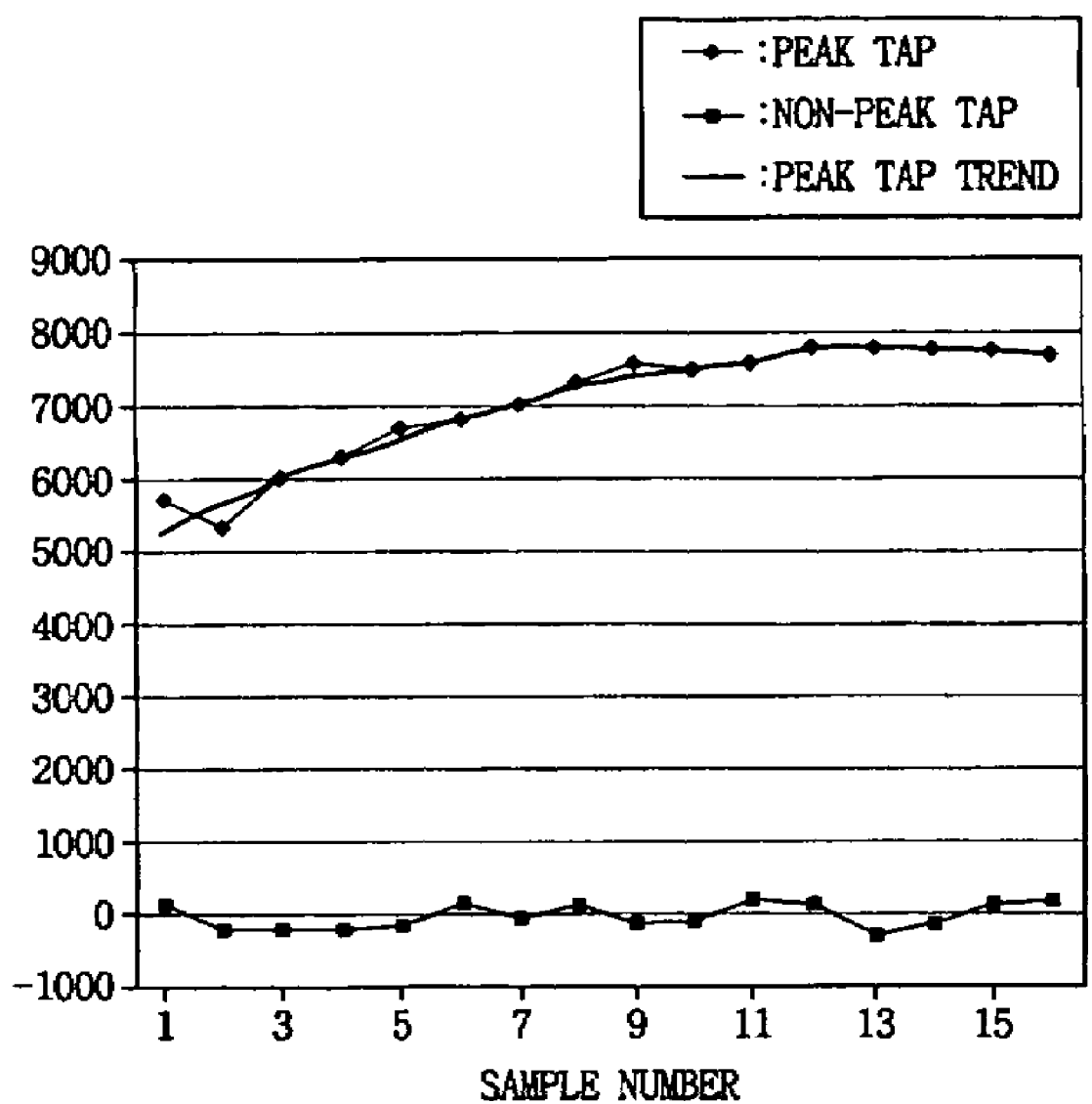
FIG. 12 is a graph showing plots of the fractional variation values extracted from Tables I to III for a non-peak tap (Table 1) and a peak tap (Table III).

FIG. 12 is a graph showing plots of the fractional variation values extracted from Tables I to III for a non-peak tap (Table 1) and a peak tap (Table III). It can be seen that the peak tap trend is a cluster well away from the zero axis and the non-peak tap trend have values which swing in different directions around the zero axis.

It is readily appreciated by one ordinary skilled in the art that although the embodiments of the filter of the present invention are shown and described with circuit components, the filter can be implemented by software or by use of a storage device having stored codes executable by a processor, and upon execution of the codes, the filtering functions as above described are implemented. The storage device is preferably one of a flash memory and a ROM.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

I claim:

1. A global positioning system (GPS) receiver, comprising: a converter for converting received GPS signals to in-phase (I) and quadrature-phase (Q) digital signals; a correlator for generating expected codes and correlating the I and Q digital signals with the expected codes to output sampled I values and sampled Q values for a tap; a digital filter for filtering the sampled I values and sampled Q values to modified I values and modified Q values, and for summing the modified I values and modified Q values to output variation data; a memory for storing the variation data; a domain transformer for performing domain transform on the variation data to output a transformed value; and a comparator for comparing the transformed value to a threshold value for determining the presence of a peak at the tap.

2. The receiver of claim 1, wherein the sampled I values and sampled Q values are modified by assigning a positive value to the sampled I value or sampled Q value when a present sample I value or Q value has a different sign from the immediately prior sample I value or sample Q value.

3. The receiver of claim 1, wherein the modified I values and modified Q values are fractional reductions of respective sampled I values and sampled Q values, the fractional reduction being the same for both the sampled I values and the sampled Q values.

4. The receiver of claim 3, wherein the fractional reduction is one half.

5. The receiver of claim 1, wherein the filter includes a pair of delay elements and a pair of single bit comparators, wherein the delay elements delay a sign bit of the sampled I value and the sampled Q value to output a prior sign value, and the single bit comparators compare a sign of the present sampled Q value with the prior sign value to provide a positive output if the present and the prior sign values are different.

6. The receiver of claim 5, wherein the filter further includes an adder for performing the summing operation on the modified I value with the modified Q value, including the sign bits.

7. The receiver of claim 1, wherein the domain transformer is a Fast Fourier Transformer.

8. The receiver of claim 1, wherein the memory further stores the sampled I and Q values of the tap identified as having a peak.

9. The receiver of claim 1, wherein the memory is one of a SRAM and a DRAM.

10. A global positioning system (GPS) receiver, comprising: a converter for converting received GPS signals of a tap to in-phase (I) and quadrature-phase (Q) digital signals; a correlator for correlating the I and Q digital signals with expected codes to output sampled I values and sampled Q values, each of the sampled I values and sampled Q values having a sign bit for signifying direction; a digital filter for filtering at least the sign bits of the sampled I values and sampled Q values and determining whether a potential peak exists at the tap based on the number of change in direction in the sign bits of the sampled I values and sampled Q values; a domain transformer for performing domain transform on data derived from the sampled I values and sampled Q values of the tap determined to have a potential peak and outputting a transformed value; and a comparator for comparing the transformed value to a threshold value for determining the presence of a peak at the tap.

11. The receiver of claim 10, further including a memory for storing the data derived from the sampled I values and sampled Q values of the tap determined to have a potential peak.

12. The receiver of claim 11, wherein the memory is one of a SRAM and a DRAM.

13. The receiver of claim 10, wherein the data is derived from the sampled I values and sampled Q values by adding sign-modified I values to sign-modified Q values.

14. The receiver of claim 10, wherein the sampled I values and sampled Q values are filtered by assigning a positive value to the sampled I value or sampled Q value when a present sample I value or Q value has a different sign from the immediately prior sample I value or sample Q value.

15. The receiver of claim 14, wherein the filtered I values and filtered Q values are fractional reductions of respective sampled I values and sampled Q values, the fractional reduction being the same for both the sampled I values and the sampled Q values.

16. The receiver of claim 10, wherein the filter includes a pair of delay elements and a pair of single bit comparators, wherein the delay elements delay a sign bit of the sampled I value and the sampled Q value to output a prior sign value, and the single bit comparators compare a sign of the present sampled Q value with the prior sign value to provide a positive output if the present and the prior sign values are different.

17. A method for processing global positioning system (GPS) signals for determining position, comprising: receiving GPS signals from one or more satellites; converting the received GPS signals to in-phase (I) and quadrature-phase (Q) digital signals of a tap; generating expected codes and correlating the I and Q digital signals with the expected codes to output sampled I values and sampled Q values; digitally filtering the sampled I values and sampled Q values to modified I values and modified Q values, and summing the modified I values and modified Q values to output variation data; storing in memory the variation data; performing domain transform on the variation data to output a transformed value; and comparing the transformed value to a threshold value for determining the presence of a peak at the tap.

18. The method of claim 17, wherein the sampled I values and sampled Q values are modified by assigning a negative value to the sampled I value or sampled Q value when a present sampled I value or Q value has a different sign from the immediately prior sampled I value or sampled Q value.

19. The method of claim 17, wherein the modified I values and modified Q values are fractional reductions of respective sampled I values and sampled Q values, the fractional reduction being the same for both the sampled I values and the sampled Q values.

20. The method of claim 19, wherein the fractional reduction is one half.

21. The method of claim 17, wherein the step of filtering includes delaying a sign bit of the sampled I value and the sampled Q value to output a prior sign value, and comparing a sign of the present sampled Q value with the prior sign value to provide a negative output if the present and the prior sign values are different.

22. The receiver of claim 21, wherein the step of filtering further includes summing the modified I value with the modified Q value, including the sign bits.

23. The method of claim 17, wherein the domain transform is Fast Fourier Transform.

24. The method of claim 17, further including storing in the memory the sampled I and Q values of the tap identified as having a peak and discarding sampled I and Q values of other taps.

25. A method for processing global positioning system (GPS) signals, comprising: converting received GPS signals of a tap to in-phase (I) and quadrature-phase (Q) digital signals; correlating the I and Q digital signals with expected codes to output sampled I values and sampled Q values, each of the sampled I values and sampled Q values having a sign bit for signifying direction; digitally filtering at least the sign bits of the sampled I values and sampled Q values and determining whether a potential peak exists at the tap based on the number of change in direction in the sign bits of the sampled I values and sampled Q values; performing domain transform on data derived from the sampled I values and sampled Q values of the tap determined to have a potential peak and outputting a transformed value; and comparing the transformed value to a threshold value for determining the presence of a peak at the tap.

26. The method of claim 25, further including storing in a memory the data derived from the sampled I values and sampled Q values of the tap determined to have a potential peak.

27. The method of claim 26, wherein the memory is one of a SRAM and a DRAM.

28. The method of claim 25, wherein the data is derived from the sampled I values and sampled Q values by adding sign-modified I values to sign-modified Q values.

29. The method of claim 25, wherein the sampled I values and sampled Q values are filtered by assigning a positive value to the sampled I value or sampled Q value when a present sample I value or Q value has a different sign from the immediately prior sample I value or sample Q value.

30. The method of claim 25, wherein the filtered I values and filtered Q values are fractional reductions of respective sampled I values and sampled Q values, the fractional reduction being the same for both the sampled I values and the sampled Q values.

31. The method of claim 25, wherein the step of filtering includes delaying a sign bit of the sampled I value and the sampled Q value to output a prior sign value, and comparing a sign of the present sampled Q value with the prior sign value to provide a positive output if the present and the prior sign values are different.

32. A program storage device having code stored thereon, executable by a processor to perform method steps for processing GPS signals, the method comprising: correlating I and Q digital signals with expected codes to output sampled I values and sampled Q values, each of the sampled I values and sampled Q values having a sign bit for signifying direction; digitally filtering at least the sign bits of the sampled I values and sampled Q values and determining whether a potential peak exists at the tap based on the number of change in direction in the sign bits of the sampled I values and sampled Q values; performing domain transform on data derived from the sampled I values and sampled Q values of the tap determined to have a potential peak and outputting a transformed value; and comparing the transformed value to a threshold value for determining the presence of a peak at the tap.

33. The program storage device of claim 32, the method further including storing in a memory the data derived from the sampled I values and sampled Q values of the tap determined to have a potential peak.

34. The program storage device of claim 33, wherein the memory is one of a SRAM and a DRAM.

35. The program storage device of claim 32, wherein the data is derived from the sampled I values and sampled Q values by adding sign-modified I values to sign-modified Q values.

36. The program storage device of claim 32, wherein the stored program device is one of a flash memory or ROM.

* * * * *